(No Model.)

P. R. RASMUSSEN.
EDGING MACHINE.

No. 580,221.     Patented Apr. 6, 1897.

Witnesses:
Thomas M. Smith
Wilhelm Vogt

Inventor:
Peter R. Rasmussen
By J. Walter Douglass
Attorney.

UNITED STATES PATENT OFFICE.

PETER R. RASMUSSEN, OF PHILADELPHIA, PENNSYLVANIA.

EDGING-MACHINE.

SPECIFICATION forming part of Letters Patent No. 580,221, dated April 6, 1897.

Application filed April 20, 1895. Serial No. 546,460. (No model.)

*To all whom it may concern:*

Be it known that I, PETER R. RASMUSSEN, a citizen of the United States, residing at Philadelphia, (Germantown,) in the county of Philadelphia and State of Pennsylvania, have invented certain new and useful Improvements in Edging-Machines, of which the following is a specification.

My invention has relation to grass trimming or edging machines of that class in which the framework carries a cutting blade or blades and the wheel or wheels on which the machine is supported actuates mechanism for operating the blade or blades in the travel of the machine; and it relates particularly to the construction and arrangement of such a machine.

The principal object of my invention is to provide a durable, efficient, simple, and comparatively inexpensive machine for trimming grass otherwise inaccessible to an ordinary mowing-machine or a lawn-mower, and provided with a cutting device which consists of one or more fixed blades and an oscillating tongue or blade adapted, in connection with the fixed blade or blades, to shear off the grass, and the said oscillating tongue or blade controlled as to its movement by mechanism operated by the supporting wheel or wheels of the machine, and the said cutting device adapted also to be adjusted at an angle to the ground and to be operated in such angular position by the said mechanism controlled by the said supporting-wheel of the machine.

My invention consists of a grass trimming or edging machine constructed and arranged in substantially the manner hereinafter described and claimed.

The nature, general characteristics, and scope of my invention will be more fully understood from the following description, taken in connection with the accompanying drawings, forming part hereof, and in which—

Figure 1:
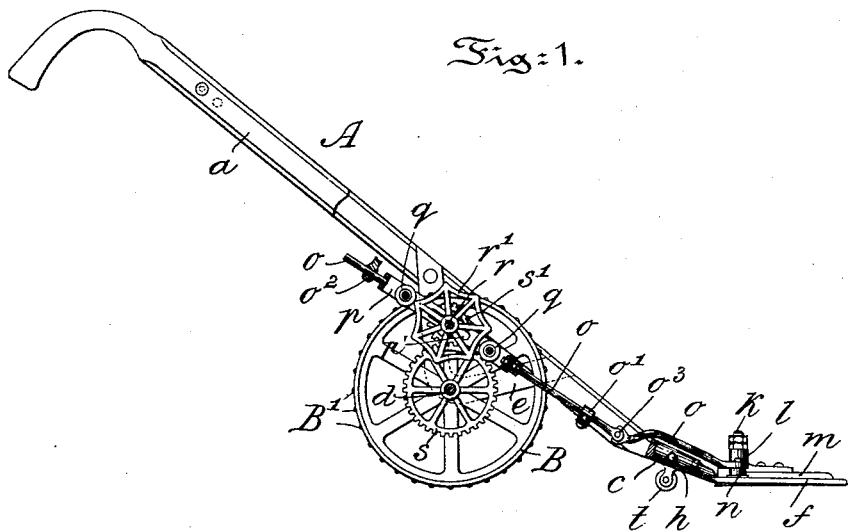
Figure 2:
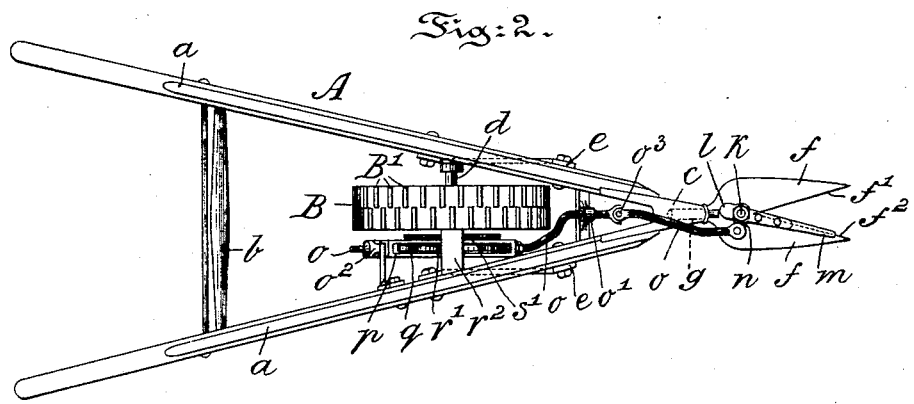

Figure 1 is a side elevation, partly broken away, of a grass-trimming machine embodying the main features of my invention; and Fig. 2 is a top or plan view of said machine.

Referring to the drawings, A represents the framework, consisting of the two handles or standards $a$ $a$, united at one end by a cross-bar $b$ and at the other end by the hollow bracket $c$. Between the standards $a$ $a$, near the lower end thereof, is located a traction-wheel B, on which the machine is supported, and which wheel constitutes the power-wheel of the mechanism. The wheel B is keyed or otherwise secured to a shaft $d$, having its bearings in the brackets $e$, depending from the standards $a$. The bracket $c$ carries a V-shaped knife $f$, the shank $g$ of which is adapted to fit the hollow of said bracket $c$ and to have a range of movement therein. The shank $g$ may be fixed in the bracket $c$ in required position by means of a tightening nut or screw $h$ or by any suitable means. Projecting upward from the V-shaped knife $f$, at or near the shank $g$ thereof, is a pin or bolt $k$, adapted to receive a bracket $l$, carrying an oscillating tongue or blade $m$, the pin or bolt $k$ acting as a pivot around which said bracket $l$ and tongue $m$ are adapted to turn. The bracket $l$ is also provided with an arm or crank $n$, to which is pivotally secured one end of the reciprocating rod $o$, adapted to move in bearings $o'$ and $o^2$, secured to or depending from the standards $a$. Near the upper end of this rod $o$ is a slotted enlargement or box $p$, in which are pivoted the two friction-rolls $q$.

The box $p$ is traversed by a shaft $r$, on which is keyed or otherwise secured a star or cam wheel $r'$, the periphery of which rests between the two rolls $q$ and is adapted to alternately strike the same. The shaft $r$ passes through a slot $p'$ in the walls of the box $p$ and is supported in an inverted-U-shaped strap $r^2$, extending from the bracket $e$, substantially as indicated in Fig. 2. The shaft $d$ of the wheel B carries also a gear-wheel $s$, which is keyed or otherwise secured to said shaft $d$, and the gear-wheel $s$ meshes with a gear-wheel $s'$, keyed to the shaft $r$ outside the box $p$. The reciprocating rod $o$ is provided near the crank-arm $n$ with a universal or swivel joint $o^3$, by means of which the lower portion of said rod, which is pivoted to the crank-arm, may be turned when the knife $f$ is turned in its bracket $c$. This bracket $c$ is supported above the ground by a roller $t$, whereby the knife $f$ is carried a predetermined distance above the ground. The wheel B is provided on its periphery with the projections or ribs B', by means of which the wheel is brought into a closer frictional engagement with the ground while the machine is being moved.

In operation as the machine is pushed along the wheel B rotates, and through its shaft $d$ rotates the gear-wheel $s$, which in turn, through the gear $s'$ and shaft $r$, rotates the star-wheel $r'$. This wheel $r'$ is so arranged that when one of its points rests against one roll $q$ a concavity comes opposite the other roll $q$. This permits of the rolls $q$ being moved a distance corresponding to the height of a point above a concavity on the wheel, and in consequence the box $p$, carrying the rolls, and the rod $o$, carried by the box, are reciprocated up and down while the star-wheel is in rotation. The slot $p'$ in the box $p$ permits of this reciprocating motion. Again, the motion thus imparted to the rod is through the arm $n$ and bracket $l$ transferred into an oscillating motion of the tongue or blade $m$. This blade is thus made to alternately slide over each cutting edge $f'$ or $f^2$ of the knife $f$ and to cut the grass brought into the path of said knife and tongue somewhat in the manner of a pair of shears. The roller $t$ supports the knife a certain distance above the ground, so that the grass will be cut a predetermined height. Where the grass grows on an embankment, the knife $f$ may be turned in its bracket to the necessary angle, so that it will cut the grass parallel with the embankment while the wheel B is traveling on level ground.

The rod $o$, through its joint $o^3$, will accommodate itself to the turning of the knife, so that it will actuate the tongue $m$, no matter at what angle the knife is turned. The joint $o^3$ is formed at that point of the pitman $o$ which reciprocates in line with the axis of the pivot $g$.

Having thus described the nature and objects of my invention, what I claim as new, and desire to secure by Letters Patent, is—

An edging-machine provided with standards, a fixed V-shaped blade pivoted at and projecting from the forward end of said standards, said blade being revolubly adjustable in said standards upon said pivotal connection, a blade pivoted at the crotch of said fixed blade, a bell-crank arm secured to said blade, a reciprocatory pitman arranged in line with the axis of the pivotal support of the fixed blade and having a universal joint, a guide secured to the standards and adapted to support the pitman, a wheel supporting said standards and mechanism operated by said wheel and adapted to reciprocate said pitman, substantially as described.

In testimony whereof I have hereunto set my signature in the presence of two subscribing witnesses.

PETER R. RASMUSSEN.

Witnesses:
J. WALTER DOUGLASS,
THOMAS M. SMITH.